US006899017B2

(12) United States Patent
Meagher et al.

(10) Patent No.: US 6,899,017 B2
(45) Date of Patent: May 31, 2005

(54) WHEEL CYLINDER FOR ACTUATING A VEHICLE BRAKE AND A METHOD OF MANUFACTURING SAME

(75) Inventors: Michael P. Meagher, Corinth, TX (US); Art D. Johnson, Copper Canyon, TX (US); Tien Nguyen, Carrollton, TX (US)

(73) Assignee: Hilite International, Inc., Carrollton, TX (US)

( * ) Notice: Subject to any disclaimer, the term of this patent is extended or adjusted under 35 U.S.C. 154(b) by 84 days.

(21) Appl. No.: 10/308,479

(22) Filed: Dec. 3, 2002

(65) Prior Publication Data

US 2004/0103779 A1 Jun. 3, 2004

(51) Int. Cl.[7] .................................................. F16J 1/04
(52) U.S. Cl. .................................................. 92/222
(58) Field of Search .................... 92/222, 111; 60/533, 60/563

(56) References Cited

U.S. PATENT DOCUMENTS 2,140,778 A * 12/1938 White ........................ 92/245
2,212,246 A * 8/1940 Pierce et al. .................. 92/50
2,938,349 A * 5/1960 Britton .......................... 92/75
3,478,649 A * 11/1969 Lewis .......................... 92/50
4,742,897 A * 5/1988 Hiroshi et al. ........... 188/79.51
4,896,584 A * 1/1990 Stoll et al. .................... 92/5 R
5,400,879 A * 3/1995 Johannesen ............. 188/79.62
5,601,345 A * 2/1997 Tackett ................... 303/116.4
5,870,814 A 2/1999 Herron
5,882,089 A 3/1999 Nakamura et al.
6,325,181 B1 12/2001 Di Ponio
6,371,257 B1 4/2002 Connolly

OTHER PUBLICATIONS

Aluminum 6061–T6; 6061–T651, MatWeb.com.*

* cited by examiner

*Primary Examiner*—Edward K. Look
*Assistant Examiner*—Michael Leslie
(74) *Attorney, Agent, or Firm*—Haynes and Boone, LLP

(57) ABSTRACT

A wheel cylinder for engaging a brake shoe according to which at least one piston is disposed in the bore of a body member and is adapted to move outwardly in response to a predetermined fluid pressure in the bore into engagement with a brake shoe.

8 Claims, 3 Drawing Sheets

10 20 16 16b 30 32 36 24a 26a 24 26 28 38

A4

A4
32
26a
26
28

16
18
16a
20
24
24a
30

16
16a
20
16b
10

A4

WHEEL CYLINDER FOR ACTUATING A VEHICLE BRAKE AND A METHOD OF MANUFACTURING SAME

BACKGROUND

This invention relates to a wheel cylinder and, more particularly, to a wheel cylinder including a piston for actuating a drum-style brake for vehicles, such as automobiles.

Drum-style brakes for vehicles are well known and include a wheel cylinder usually having two hydraulically actuated pistons connected to corresponding brake shoes, which face the interior circumferential surface of the drum. The pistons respond to increases in hydraulic pressure caused by the actuation of the brake pedal and expand outwardly from the wheel cylinder body in opposite directions to displace the shoes outwardly into frictional contact with the brake drum. An arrangement of springs, or the like, is utilized to return the shoes, and therefore the pistons, to their original positions once the hydraulic pressure is reduced.

Typically the pistons and housing are fabricated from cast iron or other relatively soft material. Therefore, the portion of the pistons engaging the brake shoes must be fabricated from a stronger material, such as forged steel, which can withstand the forces from the brake shoe or a stronger component, usually in the form of an insert, has to be manufactured separately and assembled to each piston, which adds to the manufacturing and assembly labor and to the cost of the pistons. Another problem with these designs concerns the durability of the wheel cylinders. Typically, the wheel cylinder is located at a relatively low point in the vehicle. With the weight density of water being higher than that of brake fluid, water in the brake system will migrate, over time, toward the lowest point in the system where the wheel cylinders are located causing rust problems of the steel or iron components.

Although some more recent designs of wheel cylinders of this type include a body and/or piston of aluminum, these designs still require a separate insert of a different, stronger, material for engaging the brake shoe.

DETAILED DESCRIPTION

Figure 1:
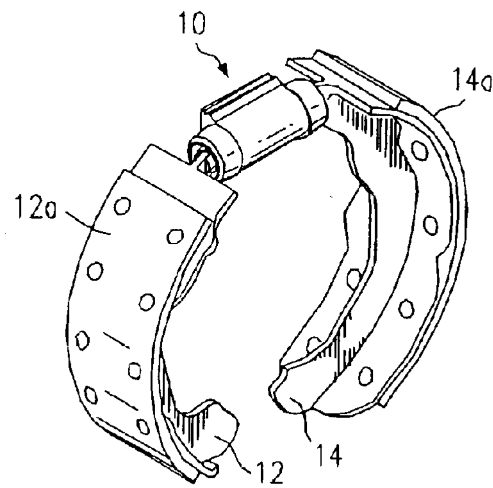
FIG. 1 is an isometric view depicting an embodiment of the wheel cylinder of the present invention shown positioned between two brake shoes.

Referring to FIG. 1 of the drawings, the reference 10 refers, in general, to a wheel cylinder according to an embodiment of the invention, shown extending between the corresponding ends of two opposing shoes 12 and 14 of a drum brake system associated with a wheel of a vehicle. Linings 12*a* and 14*a* are provided on the exterior surfaces of the shoes 12 and 14, respectively, and it is understood that the linings face corresponding circumferential surfaces inside a brake drum (not shown).

The cylinder 10 responds to an increase in hydraulic pressure in a manner to be described and expands axially outwardly in opposite directions to displace the shoes 12 and 14 outwardly so that the shoes 12 and 14, and therefore the linings 12*a* and 14*a*, respectively, move into frictional contact with the brake drum to achieve braking action. It is also understood that an arrangement of springs, or the like, are provided to return the shoes 12 and 14 to their original positions once the hydraulic pressure is reduced. Since all of this is conventional it will not be described in further detail.

Figure 2:
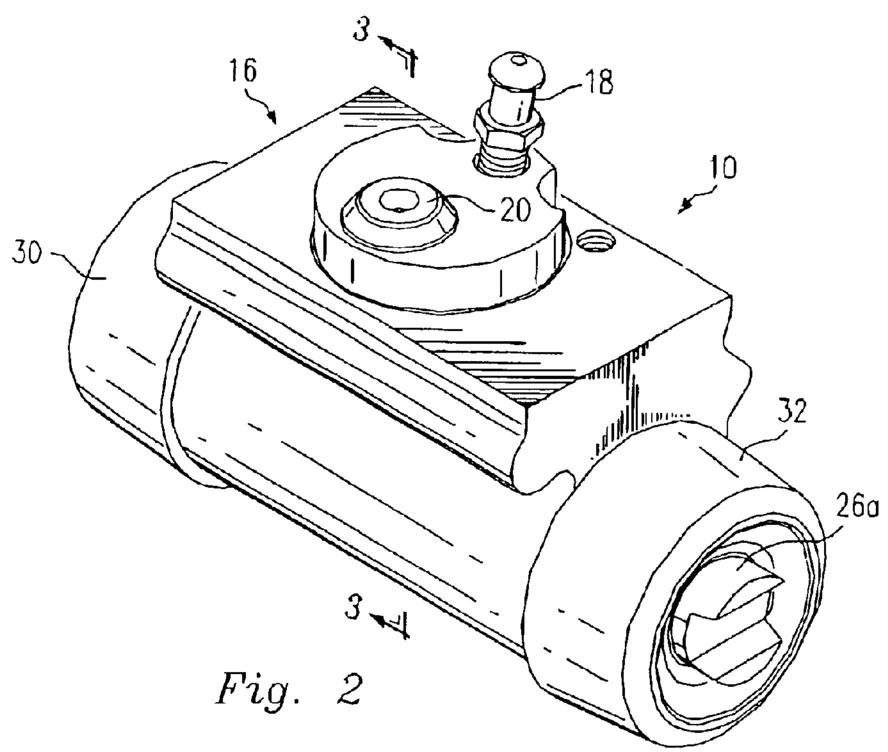
FIG. 2 is an enlarged isometric view of the wheel cylinder of FIG. 1 with the back side, as depicted in FIG. 1, facing upwardly.
Figures 3, 4:
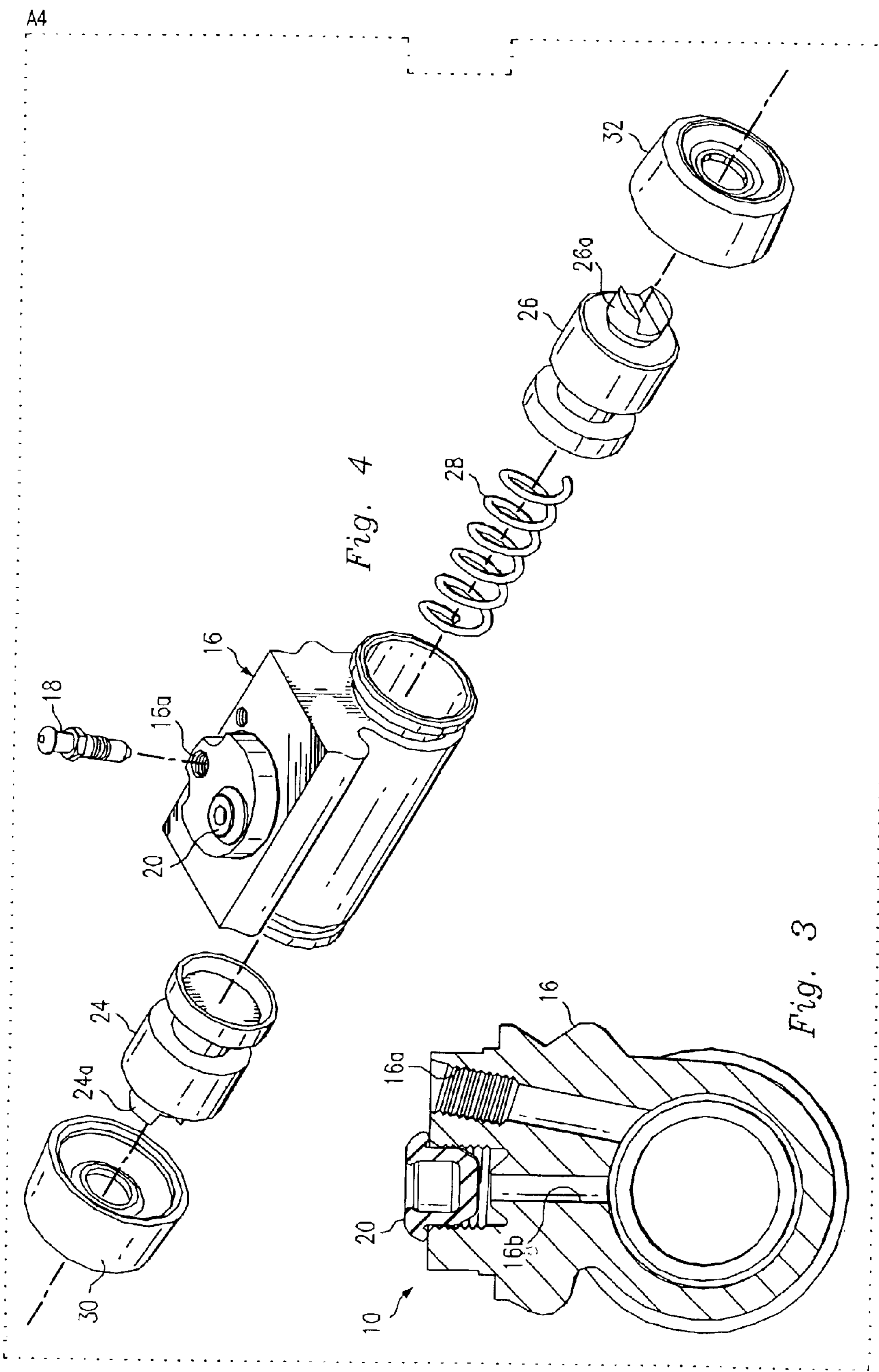
FIG. 3 is a transverse sectional view taken along the line 3—3 of FIG. 2.
FIG. 4 is an exploded isometric view of the wheel cylinder of FIG. 2.

Referring to FIGS. 2 and 3, the cylinder 10 consists of a hollow body member 16 having a generally cylindrical shape with the exception of an extended flat upper portion. Two transverse passages 16*a* and 16*b* (FIG. 3) extend from the upper surface of the flat upper portion of the body member into the interior bore of the body member. The upper end portion of the passage 16*a* is threaded for receiving an externally threaded port 18 (FIG. 3) which is adapted to be connected to a tube, conduit, or the like (not shown) for supplying hydraulic fluid to the body member. A rubber port plug 20 is installed in the upper end of the passage 16*b* for protection during shipping prior to drum brake assembly and serves as a cap for bleeding during operation of the cylinder 10.

Referring to FIG. 4, two pistons 24 and 26 are disposed in the bore of the body member 16 and are adapted to slide in the bore. A spring 28 extends between the pistons 24 and 26 to normally force them axially inwardly. Two flexible dust boots 30 and 32 extend over the respective ends of the cylindrical portion of the body member 16 and the pistons 24 and 26.

Two substantially U-shaped yokes 24*a* and 26*a* are formed at one end of the pistons 24 and 26, respectively, and are formed integrally with the pistons. The yokes 24*a* and 26*a* engage the brake shoes 12 and 14, respectively, with a tab (FIG. 1) on each brake shoe extending between the side walls of its corresponding yoke.

The body member 16 is machined from cast iron or aluminum extrusion and the pistons 24 and 26, and therefore the yokes 24*a* and 26*a*, are formed of a relatively harder aluminum such as aluminum having the industry designation 6061T6 which is sufficiently hard to withstand the forces encountered when the yokes engage the above-mentioned members on the brake shoes 12 and 14, respectively. Each piston 24 and 26, including its corresponding yoke 24*a* and 26*a*, respectively, is manufactured by machining a single extruded aluminum bar to form the piston and the yoke. The dust boots 30 and 32 are made of rubber, or other flexible, resilient material.

Figure 5:
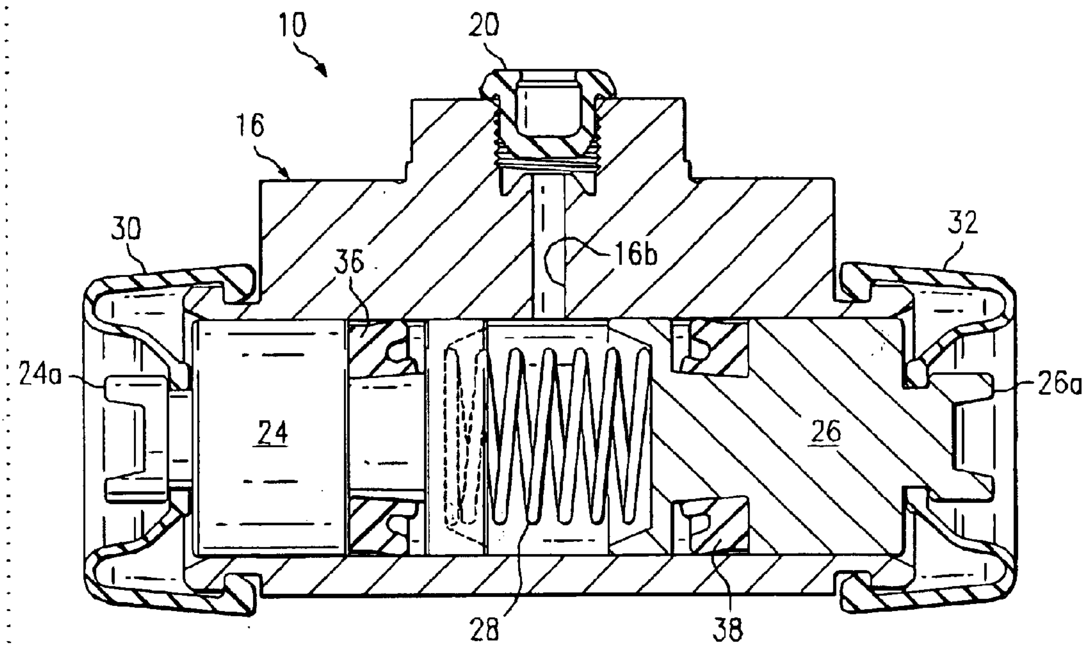
FIG. 5 is a longitudinal sectional view of the wheel cylinder of FIG. 2.

As shown in FIG. 5, an annular flange on one end of each boot 30 and 32 extends in a corresponding circular groove in the body member 16, and the other ends of the boots 30 and 32 are enlarged and extend in a circular groove in the piston 24 and 26, respectively.

Two lip-seals 36 and 38 are disposed in corresponding circumferential grooves formed in the pistons 24 and 26, respectively, and engage the inner surface of the body member 16 defining its bore, in order to seal against the bore to prevent fluid ingress and egress.

The cylinder 10 is depicted in an inactive mode in FIG. 5, e.g., with the pistons 24 and 26 in a retracted position. In this mode, the spring 28 exerts a slight outwardly axially directed force against the pistons 24 and 26, which is insufficient to move the pistons outwardly from the body member 16. The passage 16*b* and the portions of the bore of the body member 16 not occupied by the pistons 24 and 26 contain hydraulic fluid which is supplied, from an external source, through the port 18 and the passage 16*b*.

Figure 6:
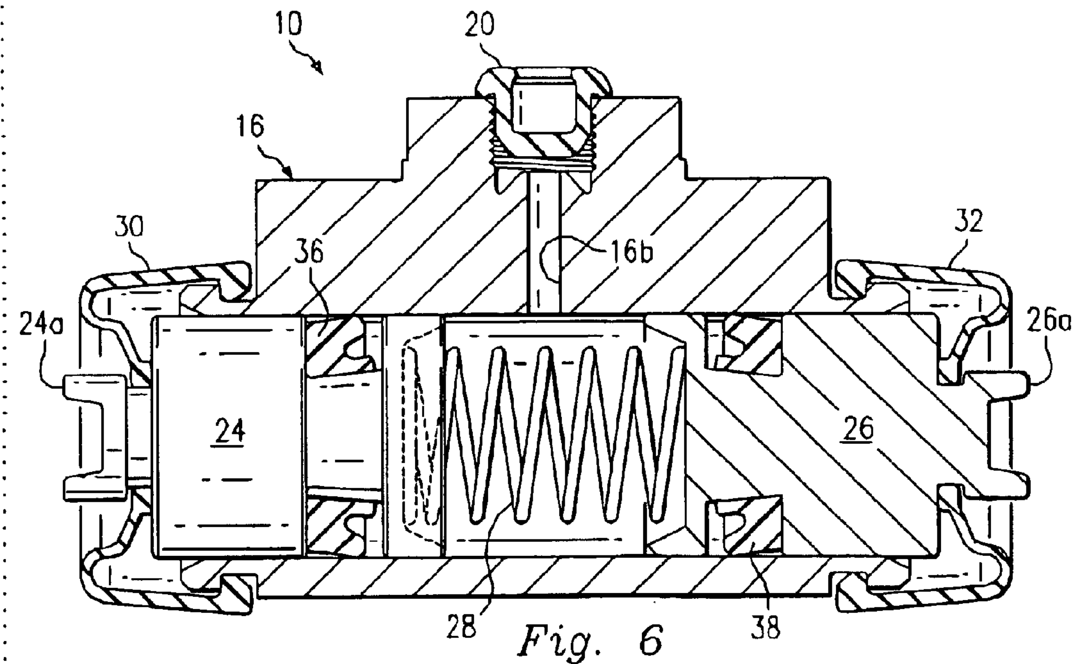
FIG. 6 is a view similar to that of FIG. 5 but depicting the expanded operational mode of the wheel cylinder.

In operation, when the driver of the vehicle pushes on the brake pedal, additional hydraulic fluid is directed, via the port 18 and the passage 16*a*, into the bore of the body member 16. This increases the pressure of the fluid sufficiently to force the pistons 24 and 26 axially outwardly in opposite directions to the extended positions of FIG. 6, with the flexible dust boot 30 and 32 accommodating this movement. This forces the brake shoes 12 and 14 (FIG. 1) outwardly so that their linings 12*a* and 14*a* engage corresponding surfaces of the brake drum and establish a frictional engagement to apply a braking action to the brake drum. The aforementioned relatively hard aluminum forming the pistons 24 and 26 and the yokes 24*a* and 26*a* is sufficient to withstand the forces resulting from their engagement with the brake shoes 12 and 14 without damaging the yokes. When the brake pedal is released by the driver, the hydraulic pressure is reduced, and the abovemention springs associated with the brake drum force the shoes 12 and 14 inwardly, and therefore the pistons 24 and 26 back into the bore of the body member 16. During this operation fluid can be vented through the passage 16*b* as needed.

It can be appreciated that the one-piece pistons can be manufactured easily, do not require an insert of a separate material, and do not require any assembly. Moreover, each piston can be formed by extruding or forming one piece of aluminum and machining the aluminum. Machining the yoke on the end of each piston does not require any additional machining time since all necessary operations can be performed on a single machine, such as a multiple spindle screw machine or multiple station transfer machine. In addition to being relatively easy to manufacture, this eliminates other problems associated with the use of separate pistons and inserts, such as loose inserts, damage, or inserts not pressed to the proper depth.

It is understood that variations may be made in the foregoing without departing from the scope of the invention. For example, the invention is not limited to a wheel cylinder having two pistons, but rather a different number of pistons can be used. Also, although only one cylinder and one set of associated brake shoes for braking one wheel of a vehicle have been described, the embodiment disclosed above is equally applicable to every wheel of the vehicle. Also, the term "vehicle" has been used in its broadest since and is meant to include any type of wheeled device including, but not limited to, automobiles, airplanes, bicycles, and go-carts. Further, the yokes described above can be replaced with any other type of engagement member. Still the pistons, including their corresponding yokes can be manufactured by other, relatively hard material as long as the objects of the invention are achieved.

Although only one exemplary embodiment of this invention has been described in detail above, those skilled in the art will readily appreciate that many other modifications are possible without materially departing from the scope of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A wheel cylinder for engaging a brake shoe, the cylinder comprising:

a housing having an inlet for receiving fluid and a bore in fluid communication with the inlet;

two pistons disposed in an axially spaced relation in the bore with each piston having a yoke formed integrally therewith and extending from one end of its corresponding piston outwardly from the housing;

the piston and the yoke being fabricated from a bar of material that is harder than the material forming the housing; and a spring disposed in the space between the pistons with the ends of the spring being directly attached to the other ends of the pistons, respectively, for moving the pistons towards each other so that fluid introduced into the space between the pistons moves the pistons away from each other to engage the brake shoe.

2. The cylinder of claim 1 wherein the space is occupied only by the springs and the fluid.

3. The cylinder of claim 1 further comprising a dust boot extending at one end of the body member and engaging the piston.

4. The cylinder of claim 1 wherein the pistons move in opposite directions in the housing in response to the introduction of the fluid.

5. A method of manufacturing a wheel cylinder that engages a brake shoe, the method comprising:

fabricating a housing having a bore;

fabricating a piston and a yoke from a single bar of material that is harder than the material forming the housing; and disposing the piston and therefore the yoke in the bore so that the introduction of fluid into the bore moves the piston and the yoke in the bore.

6. The method of claim 5 wherein the yoke is formed on one end of the piston so that it extends out from the housing.

7. The method of claim 5 further comprising fabricating an additional piston and a yoke from one bar of material that is harder than the material forming the housing; and disposing the additional piston and yoke in the bore in a spaced relation to the first-mentioned piston and yoke so that they move in opposite directions to the direction of movement of the first-mentioned piston and yoke when the fluid is introduced into the bore.

8. The cylinder of claim 7 further comprising occupying the space only by the springs and the fluid.

* * * * *